United States Patent [19]

Shapiro et al.

[11] Patent Number: 5,173,692
[45] Date of Patent: Dec. 22, 1992

[54] SYSTEM AND METHOD OF VEHICLE DETECTION

[75] Inventors: Bernard Shapiro, Montclair, N.J.; Yehuda Rosenstock, Freeport, N.Y.

[73] Assignee: AI Computer Services, Inc., Fresh Meadow, N.Y.

[21] Appl. No.: 566,607

[22] Filed: Aug. 13, 1990

[51] Int. Cl.$^5$ .............................................. G08G 1/04
[52] U.S. Cl. ..................... 340/943; 340/932.2; 340/917
[58] Field of Search ............ 340/943, 932.2, 917, 340/928, 935, 938; 364/436, 437; 367/90, 96, 97, 102

[56] References Cited

U.S. PATENT DOCUMENTS

| 3,046,522 | 7/1962 | Auer, Jr. | 340/943 X |
| 3,063,179 | 11/1962 | Auer, Jr. | 340/928 X |
| 3,141,612 | 7/1964 | Bolton | 340/943 X |
| 3,315,065 | 4/1967 | Auer, Jr. | 340/943 X |
| 3,317,892 | 5/1967 | Schwarz | 340/943 X |
| 4,187,487 | 2/1980 | Numata et al. | 367/93 |
| 4,674,069 | 6/1987 | Mizuno | 340/943 X |
| 4,789,941 | 12/1988 | Nunberg | 340/943 X |
| 5,029,094 | 7/1991 | Wong | 340/932.2 X |

Primary Examiner—Jin F. Ng
Assistant Examiner—Brian R. Tumm
Attorney, Agent, or Firm—Lackenbach, Siegel, Marzullo, Aronson & Greenspan

[57] ABSTRACT

A method for detecting vehicles includes two ultrasonic overhead detectors arranged along a lane or path of travel of a car through an access gate or entrance. The detectors measure the heights of the hood, roof and trunk of the car as it moves past the detectors. Software is used to compare the measured quantities with pre-established vehicle profiles. The method, and the associated hardware and software, can be used to count vehicles, classify vehicles as well as operate peripheral devices such as traffic lights, gates and the like.

29 Claims, 8 Drawing Sheets

Vehicle Classification Logic

| Maximum Detected Roof Height | | Minimum Vehicle Length | | Vehicle Classification |
|---|---|---|---|---|
| Greater Than Minimum Hood and Not Greater Than 7 Feet OR Greater Than 7 Feet and Less Than 12 Feet | AND | 18 Feet or Less (Up to 4 Sensors) | OR Over 18 Feet (5 or More Sensors) | Vehicle Classification |
| YES / NO | | YES | NO | Passenger Car |
| YES / NO | | NO | YES | Limo |
| NO / YES | | YES | NO | Van |
| NO / YES | | NO | YES | Truck |

SYSTEM AND METHOD OF VEHICLE DETECTION

BACKGROUND OF THE INVENTION

Field of the Invention

The present invention relates to a system and method of detecting moving vehicles by means of ultrasonic energy and, more particularly, to a system and method for reliably detecting vehicles which travel through a vehicular traffic lane for counting the vehicles, classifying vehicles, opening access gates or the like.

Detecting, distinguishing and counting moving vehicles becomes particularly important in connection with the collection of fees at toll bridges, tunnels and toll booths along highways, parking facilities, etc. In the past, common devices which have been used to detect and count vehicles have included induction loop sensors and treadles. While induction loop sensors are relatively inexpensive and easy to install and maintain, they do have disadvantages when used for vehicle counting. Amongst the errors that are frequently encountered in the use of loop sensors is when two or more vehicles pass through a lane bumper-to-bumper. Loop sensors can only detect a single vehicle since they do not exhibit the sensitivity to distinguish vehicles in close proximity to each other. Additionally, certain types of vans with front engine drive or rear engine drive may be detected as one or two vehicles, depending on the body configuration and the distribution of the vehicle's mass. Many such loop sensors must also be "tuned" to roadway conditions, and errors may result due to humidity and temperature conditions which ambient conditions tend to de-tune loop sensors. Additionally, a single loop sensor cannot determine vehicle direction and, of course, loop sensors can be fooled by a mass of metal which can simulate a vehicle.

Treadles have, for the last 50 years, been the primary means used by U.S. toll authorities for counting vehicles. Treadles are, however, more expensive than loop sensors to install and maintain, and rubber pads used in connection therewith usually require replacement periodically which increases the cost of such treadles. When multiple strips are used in a treadle, these can provide extremely accurate counts and can be used to distinguish the directions of the moving vehicles. As suggested, treadles are expensive to install and maintain and must, under heavy traffic and bad weather conditions, be replaced approximately every one or two years.

Vehicle sensors utilizing ultrasonics have been proposed at least as early as 1934 in U.S. Pat. No. 1,982,341. In U.S. Pat. Nos. 3,046,522; 3,063,179; and 3,098,213, sonic vehicle sensors are disclosed which include transmitter/receiver pairs spaced from each other along a lane of traffic for effecting gate control. Such spaced transmitter/receiver pairs have also been used for establishing directionality of vehicles moving through a monitoring zone. See, for example, U.S. Pat. Nos. 3,109,157; 3,109,926; and 3,141,612. A cashiering control system for collecting fees for vehicles at a toll plaza disclosed in U.S. Pat. No. 3,317,892 utilizes overhead mounted ultra sonic sensor units in a similar way. For the most part, the foregoing patents utilize the ultrasonic sensors to sense the presence of a vehicle, although they are generally not adapted to distinguish between different types of vehicles or vehicles and non-vehicular traffic passing through the lane.

U.S. Pat. No. 4,187,487 discloses a moving object detection system which utilizes a single ultrasonic wave transmitter and receiver above the vehicular lane. A number of readings are taken to establish a standard plane which represents the actual delay of ultrasonic energy from a road surface. On the basis of a series of such computations, an average time is established. An arbitrary range is established so that if it takes the ultrasonic waves a predetermined variation from the average, the patentee assumes that the returning pulses within that time frame is a pulse returning from the ground plane or road surface. If the time for an ultrasonic pulse to return to the sensor is less than the ground plane reflection less another predetermined time factor, the patentee assumes that such pulse returns from a vehicle. Therefore, pulses received within a narrow window are all pulses which represent the presence of a vehicle, and a signal is generated representing vehicle detection. However, this technique can produce false readings, since it does not utilize a double sensor system and the passage of any object above a certain height would provide a different signal which can appear as a vehicle. The approach disclosed in this patent ignores the profiles of vehicles and does not take into account other objects passing through the detection area which can result in similar but false results.

In U.S. Pat. No. 4,674,069, a system is described for collecting and processing data relating to moving bodies wherein a single transmitter/receiver pair above the lane of vehicular traffic transmits an ultrasonic wave signal whose frequency is varied continuously. The wave reflected from the moving body is received and frequency demodulated to obtain a signal representing a frequency variation which is processed for producing a signal representing a feature of the moving body. However, because the data is obtained continuously, large quantities of data necessarily result which can, admittedly, be used to establish the contour of vehicles and to distinguish vehicles from one another. However, such a system entails substantial amounts of data and, consequently, requires significant memories not only for storing the incoming data but also the contours or profiles of vehicles which have been stored for comparison purposes. For most applications, however, such capability is unnecessary and too costly.

In U.S. Pat. No. 4,789,941, a computerized vehicle classification system is disclosed for classifying vehicles moving in a restricted vehicular traffic lane. Such passageways do not customarily involve the passage of people, or accommodate vehicles moving faster than approximately five miles per hour. The patentee discloses a method of taking successive, close-interval height readings and comparing them to pre-stored generalized maximums for the purpose of distinguishing passenger cars from trucks and buses. The patent discloses means for classifying vehicles by their number of axles, utilizing a wheel-actuated treadle mounted across the traffic lane. The vehicle classification system that is described involves measurement of vehicle height and the counting of axles, common requirements of fee control systems used by toll booth operators. The patentee discloses the desirability of filtering out uncharacteristic or aberational readings including maximum readings that are not sustained by the next momentary reading, as would occur in measuring an object protruding from a vehicle, for example, an antenna. Minimum heights, as would occur in measuring wind blown debris in a traffic lane are also filtered out. The patentee teaches the cooperative use of treadles to initiate or actuate the ranging process required to perform each classification cycle. The treadle, which relies upon the weight of the vehicle at its axle to trigger the start of the height measurement cycle, provides a positive means for event separation and detection of each vehicle. However, the patentee's proposal to utilize, as an alternative, only height measurements to provide the classification is insufficient to distinguish people moving through a passageway from vehicles moving through the same path. The proposed system only utilizes a single acoustic transmitter/receiver pair which is not adequate to establish the dynamic signature of one or more persons in motion, i.e. the motion of arms, legs and torso, which can easily be misread as vehicles. Counting errors, resulting from the use of this arrangement, are not easily correctable by the process of filtering by height measurements alone. Additionally, the single source ultrasonic input produces an insufficient volume of readings or data to count moving vehicles accurately. Moreover, such accuracy falls off sharply as the speed of passage through the detection area increases.

SUMMARY OF THE INVENTION

Accordingly, it is an object of the present invention to provide a vehicle sensor system and method which do not have the disadvantages inherent in existing systems.

It is another object of the present invention to provide a vehicle sensor system which is simple in construction and economical to manufacture and install, namely approximately half the installed cost of other comparable devices.

It is still another object of the present invention to provide a vehicle sensor system of the type under discussion which is primarily an above ground installation, and can be used with or without treadles as an optional system component.

It is yet another object of the present invention to provide a vehicle sensor system which is extremely simple to install, utilize and maintain.

It is a further object of the present invention to provide a vehicle sensor system which is extremely reliable and trouble free since it has no moving parts.

It is still a further object of the present invention to provide a vehicle sensor system as aforementioned which is extremely accurate in the counting of vehicles and distinguishing vehicles from non-vehicular traffic.

It is yet a further object of the present invention to provide a vehicle sensor of the type under discussion which does not fail when vehicles tailgate and which can automatically distinguish the direction of a vehicle thereby having the ability to accurately maintain separate entry and exit counters for parking facilities.

It is an additional object of the present invention to provide a vehicle sensor which is substantially tamper-proof and has the ability to detect and report tampering.

In order to achieve the above objects, as well as others which will become apparent hereafter, a vehicular sensor system in accordance with the invention is disclosed for detecting vehicles having predetermined height profiles and at least a predetermined minimum length along a direction of movement through a vehicular traffic lane. The system comprises first and second ultrasonic transmitting units spaced from each other along the traffic lane a distance less than said predetermined minimum length. A first transmitting unit is arranged upstream of the direction of traffic and the second transmitting unit is arranged downstream of the direction of traffic, each of the transmitting units being mounted to transmit ultrasonic signals downwardly in the direction of a vehicle moving through the lane. First and second ultrasonic receiving units are provided, each arranged above the traffic lane for receiving ultrasonic signals emitted by an associated ultrasonic transmitting unit and reflected from the road surface or the ground and from successive portions of a vehicle travelling through the traffic lane. Height determining means is provided for determining the heights of surfaces from which reflected ultrasonic signals have been reflected and received by each of said ultrasonic receiving units. Processor means verifies absolute and relative heights and discounts spurious data, and issues a vehicular detect signal when a determination has been made that the moving object is equal to at least the minimum length and detected heights in both said ultrasonic receiving units conform with each other and conform with predetermined vehicle length and height profiles. A method is disclosed for detecting vehicles using the aforementioned system.

BRIEF DESCRIPTION OF THE DRAWINGS

The foregoing and other objects and features of the present invention will become apparent from the following description taken in conjunction with the preferred embodiments thereof with reference to the accompanying drawings, in which.

DESCRIPTION OF THE PREFERRED EMBODIMENTS

Revenue security is the primary purpose of installing vehicle detection systems in the entry and exit lanes of parking facilities. Unless adequate verification and audit controls are provided, history has shown that parking facilities are vulnerable to theft. It is generally accepted that four elements are extremely important to any sound vehicle detection system:

(1) Accurate vehicle counts;
(2) Direction sensing;
(3) Equipment reliability; and
(4) A proper audit trail.

Unless all four of these elements are present, parking facility revenues cannot be considered secure.

Figure 1:
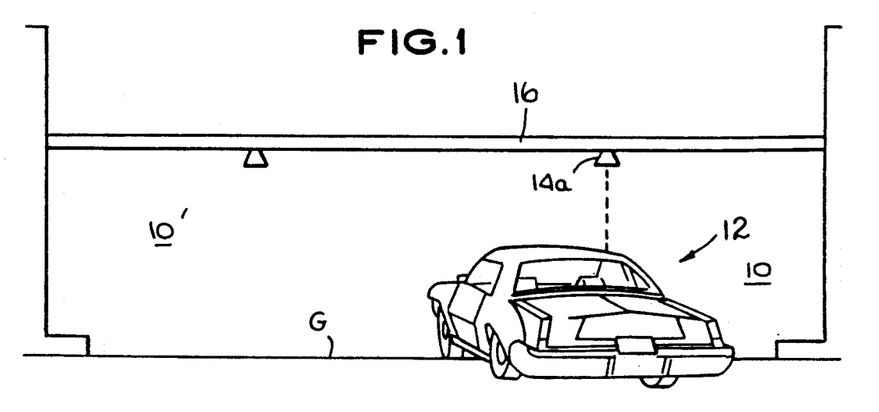
FIG. 1 is a schematic end elevational view of an installation in accordance with the present invention, showing the presence of a vehicle in a traffic lane in which vehicular detection takes place.
Figure 2:
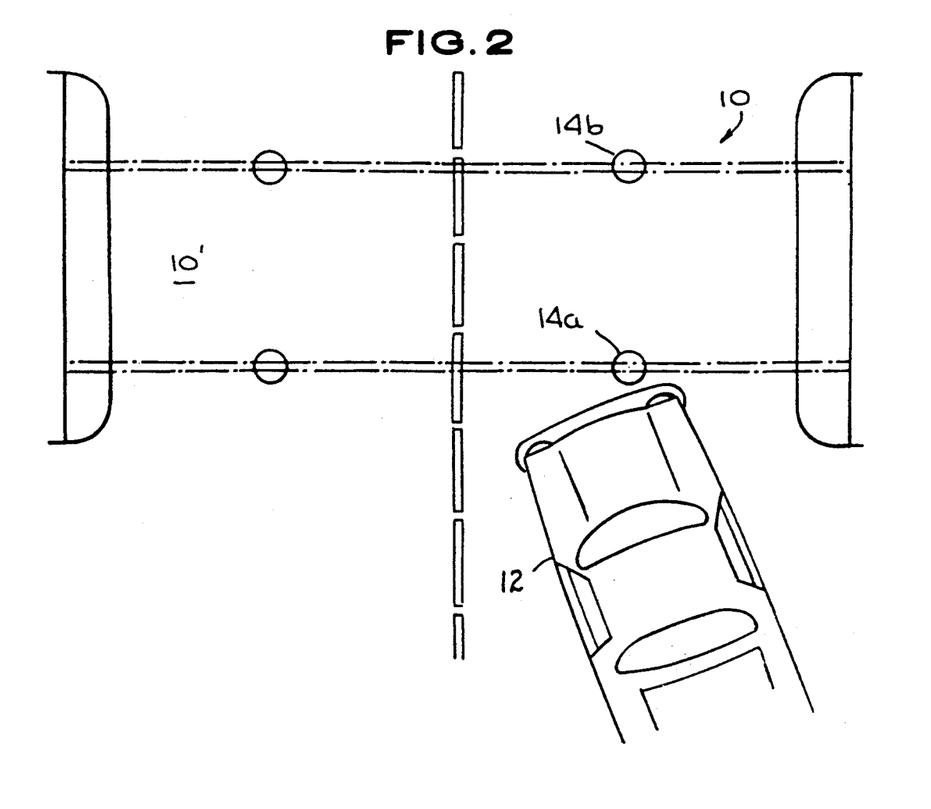
FIG. 2 is a top elevational view of the installation shown in FIG. 1, showing the two sensors spaced from each other in the direction of traffic in the lane.

Referring to FIGS. 1 and 2, the present invention will be described in the context of a vehicle sensor system for detecting vehicles having predetermined height profiles and at least a predetermined minimum length along a direction of movement through a vehicular traffic lane 10 through which a vehicle 12 is intended to pass along one direction or the reverse direction corresponding, for example, to an automobile entering or leaving a parking facility.

An important feature of the invention is the provision of ultrasonic sensors or sensors 14a and 14b which are spaced from each other along the traffic lane 10 and mounted to transmit ultrasonic signals downwardly in the direction of the moving vehicle. The details of mounting are not critical and, in the embodiment shown, the sensor or sensors are mounted on a suitable support structure 16.

Each of the sensor or sensors 14a, 14b includes ultrasonic transmitter/receiver pairs which can both transmit ultrasonic radiation as well as receive and sense incoming radiation. Such sensors may, for example, comprise transducers of the type made by the Polaroid Corporation, and sold under designation Model No. 607281. The sensor or sensors 14a, 14b are spaced from each other a distance less than the predetermined minimum length of the vehicle. The receiving units of each of the sensor or sensors, together with the associated circuitry to be described below, receives reflected ultrasonic radiation and signals emitted by an associated ultrasonic transmitting unit and reflected from the road surface or the ground G and from successive portions of the vehicle travelling through the traffic lane 10.

Figure 3:
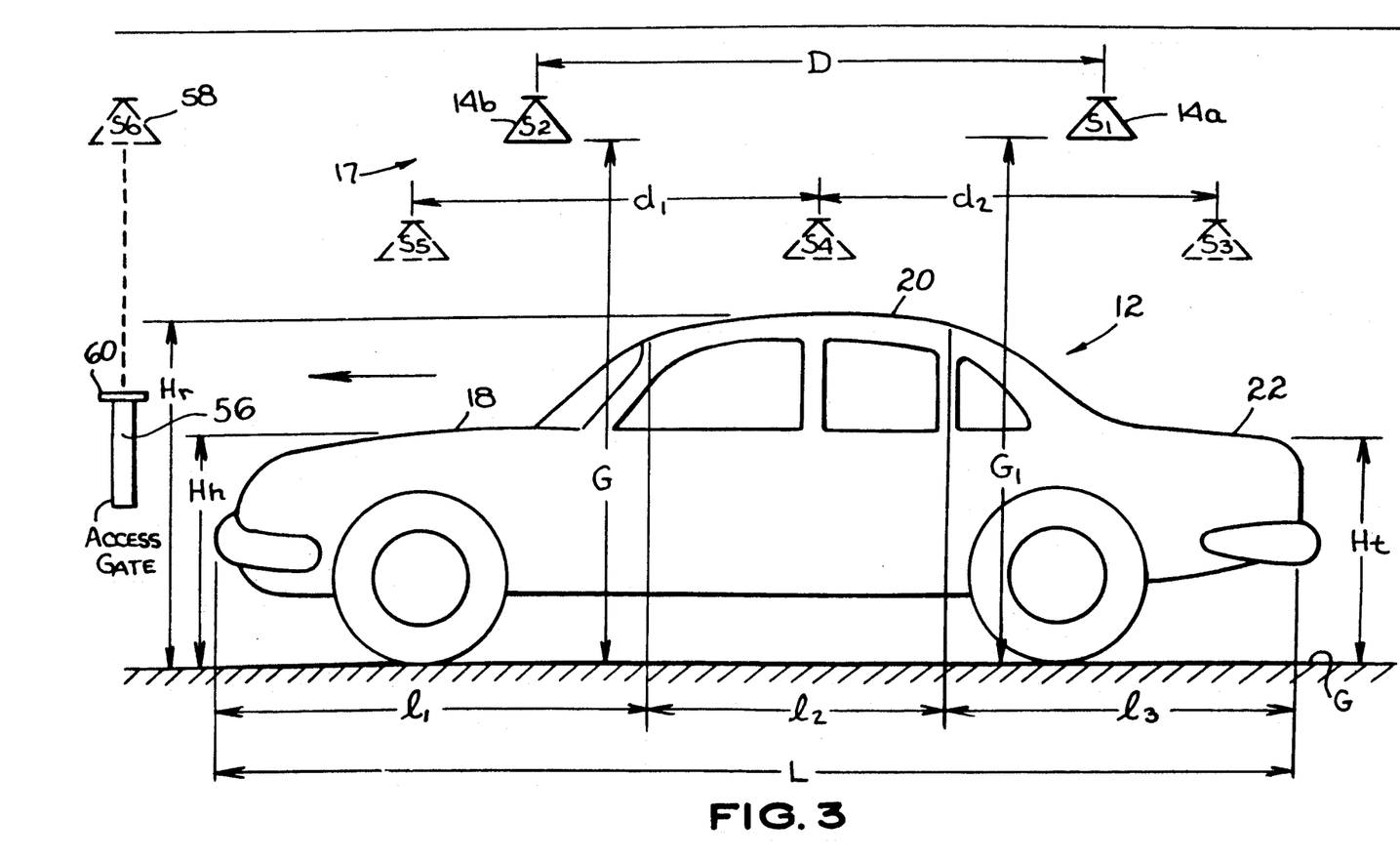
FIG. 3 shows the invention combined with an access gate.

An important feature of the present invention is the detection of moving objects through a vehicular traffic lane and comparison between measured and expected dimensional profiles which, after discounting spurious data, confirms or negates the passage of a moving vehicle through the vehicular lane. Referring to FIG. 3, an outline of the profile of a vehicle 12 is illustrated which shows a conventional shape of a passenger vehicle. The vehicle has three distinct sections, namely the hood 18 having a height $H_h$ and length $l_1$, a roof 20 having a height $H_R$ and length $l_2$, and a trunk having a height $H_t$ and length $l_3$. The overall length of the vehicle 12 is L.

As viewed in FIG. 3, a parking facility, such as a garage, is to the left and the vehicle travels from the right towards the left as during entering into the garage. Successive portions of the vehicle, including the hood 18, roof 20 and trunk 22 will initially pass under the sensor 14a (S1) and, subsequently, under the sensor 14b (S2). In order to eliminate false readings which may be caused by other objects moving through the vehicular lane which are not automobiles, such as pedestrians, the sensors S1 and S2 are spaced from each other a predetermined distance D along the length of the traffic lane which is less than L. In order to accommodate small compact models, the sensors S1 and S2 may typically be spaced five to six feet from each other—a distance large enough to insure overlapping detection of most vehicles by both S1 and S2, while large enough to avoid simultaneous detection of other common objects having length dimensions less than that minimum distance, such as baby strollers, pedestrians, etc.

While the specific or absolute heights of hoods, roofs and trunks differ from one passenger vehicle to another, the present invention relies upon the fact that some relative relationships exist which accurately define the profiles of such vehicles. For the purposes of the invention, therefore, certain absolute dimensions or dimensional relationships are assumed and attributed to passenger motor vehicles, while different absolute and relative dimensions are attributed and assumed for different types of vehicles, such as mini vans, trucks, and the like, as will be more fully discussed in connection with FIG. 7. In the presently preferred embodiment, it is assumed that a minimum height $H_h$ of the hood 18 is 24". Similarly, a maximum height $H_r$ of the roof 28 is 84". Normally, the height of the trunk 22, shown as $H_t$ is approximately equal to the height of the hood $H_h$. The overall length of the car L is, as above suggested, assumed to be greater than the six feet separation D of the sensors S1 and S2 so that there is at least one point in time when the vehicle 12 passes under both sensors S1 and S2 there will be overlapping readings based on dual reflections from the vehicle.

Also shown in FIG. 3 is the height of the sensors above the ground G, the sensor S1 being at a height $G_1$ above the ground or road surface and the sensor S2 being $G_2$ above the ground or road surface G. Normally, the heights of the sensors G1 and G2 are equal to each other, although this is not mandatory as long as the system is initially calibrated or is arranged to calibrate itself so that the heights $G_1$ and $G_2$ are understood by the system to be the heights of the respective sensors above the ground level. The three arbitrary lengths $l_1$, $l_2$ and $l_3$ which generally represent the lengths of the three major portions of the vehicle along the length direction thereof, together with the associated heights over these lengths, represent a general contour or profile of the passenger vehicle which have sufficient dimensional distinctions or relationships to facilitate a detection and definition of a vehicle. As many or as few of these dimensions or dimensional relationships may be used, depending upon the expected accuracy in the readings and the redundancy to be built into the system. The lower the requirements in terms of accuracy and the less redundancy required, the simpler and less expensive the system need be. The presently preferred embodiment will now be described which relies on the vehicle length L, and the hood and roof heights $H_h$ and $H_r$, respectively. It will, however, be evident to those skilled in the art, based upon the description that follows, that modifications can be made to the hardware and software used in this invention.

Figure 3A:
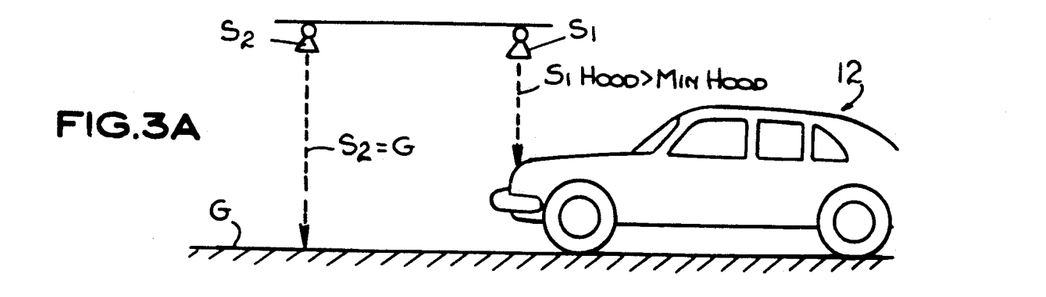
FIG. 3A is a side elevational view of the vehicle shown in FIG. 1, showing dimensions considered by the present invention in determining the profile of a vehicle being detected showing specifically initial measurements of the height of the sensors above the ground and the height of the car's hood.
Figure 3B:
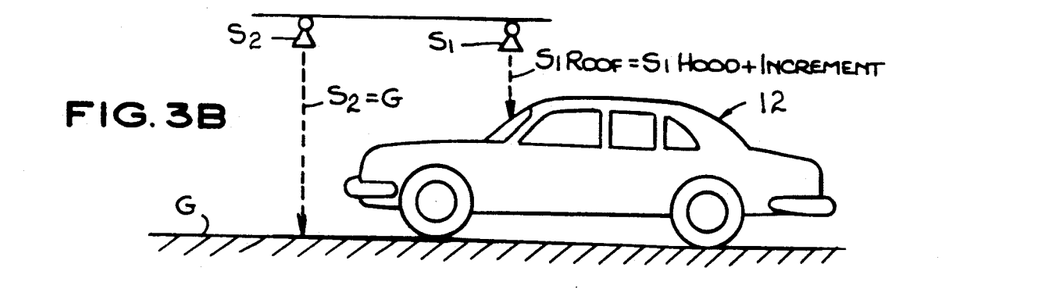
FIG. 3B is similar to FIG. 3A and showing a subsequent measurement of the hood height and an increment for the sloping windshield.
Figure 3C:
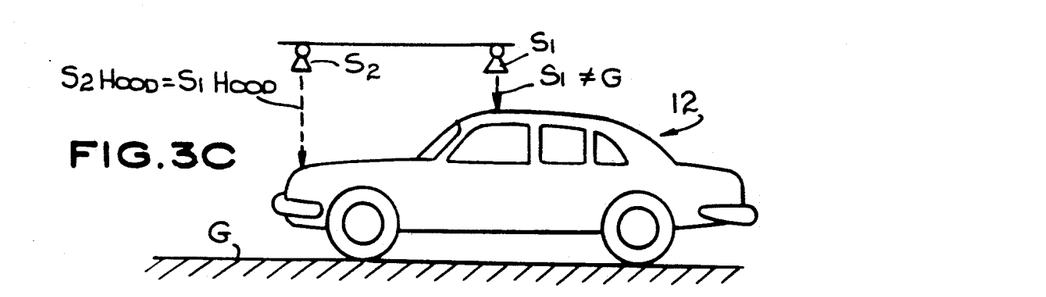
FIG. 3C is similar to FIGS. 3A-3B and showing measurements of the hood and the roof heights.
Figure 3D:
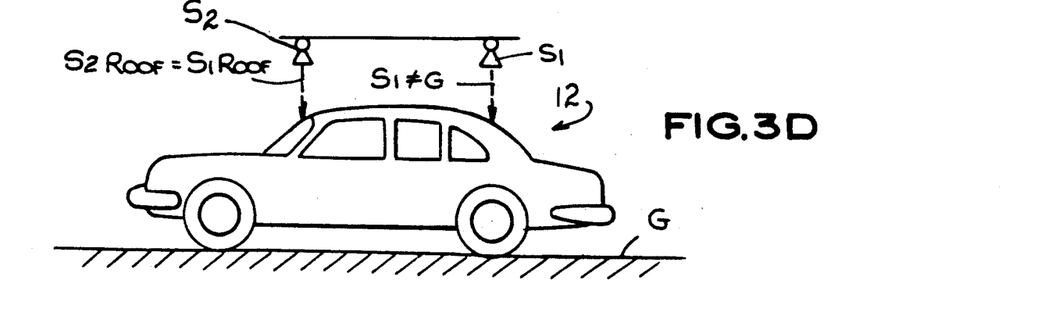
FIG. 3D is similar to FIGS. 3A-3C and showing two sensors measuring different points along the roof of the car.

As indicated in FIGS. 3A–3D, a vehicle 12 travelling from the street (on the right) into a parking facility (on the left), first passes under the sensor S1 which detects the hood 18. In FIG. 3a the sensor S1 initially detects the hood 18 while the sensor S2 detects the ground or the pavement surface G. With continued movement, the sensor S1 detects the roof height $H_r$, which can also be considered as the hood height $H_h$ plus a minimum additional increment. In FIG. 3B, the sensor S2 continues to see the ground or pavement surface G. By the time the vehicle 12 advances to the position shown on FIG. 3C, the sensor S1 continues to see the increased height $H_r$ of the roof 20, while the sensor S2 no longer sees the ground or pavement surface, but starts to sense the hood height $H_r$, the same hood height initially detected by the sensor S1. Similarly, with further movement of the vehicle 12 to the position shown on FIG. 3D, both sensors S1 and S2 detect the roof height $H_r$. As will become more evident below in connection with the description of FIGS. 4 and 5, and the presently preferred embodiment described herein, it is important not only that the sensors S1, S2 detect certain heights and/or certain height relationships, but that these parameters be repeated at each of the sensors S1, S2. This would always, of course, be the case with an advancing vehicle which initially passes first under S1 and subsequently under S2.

Figure 4:
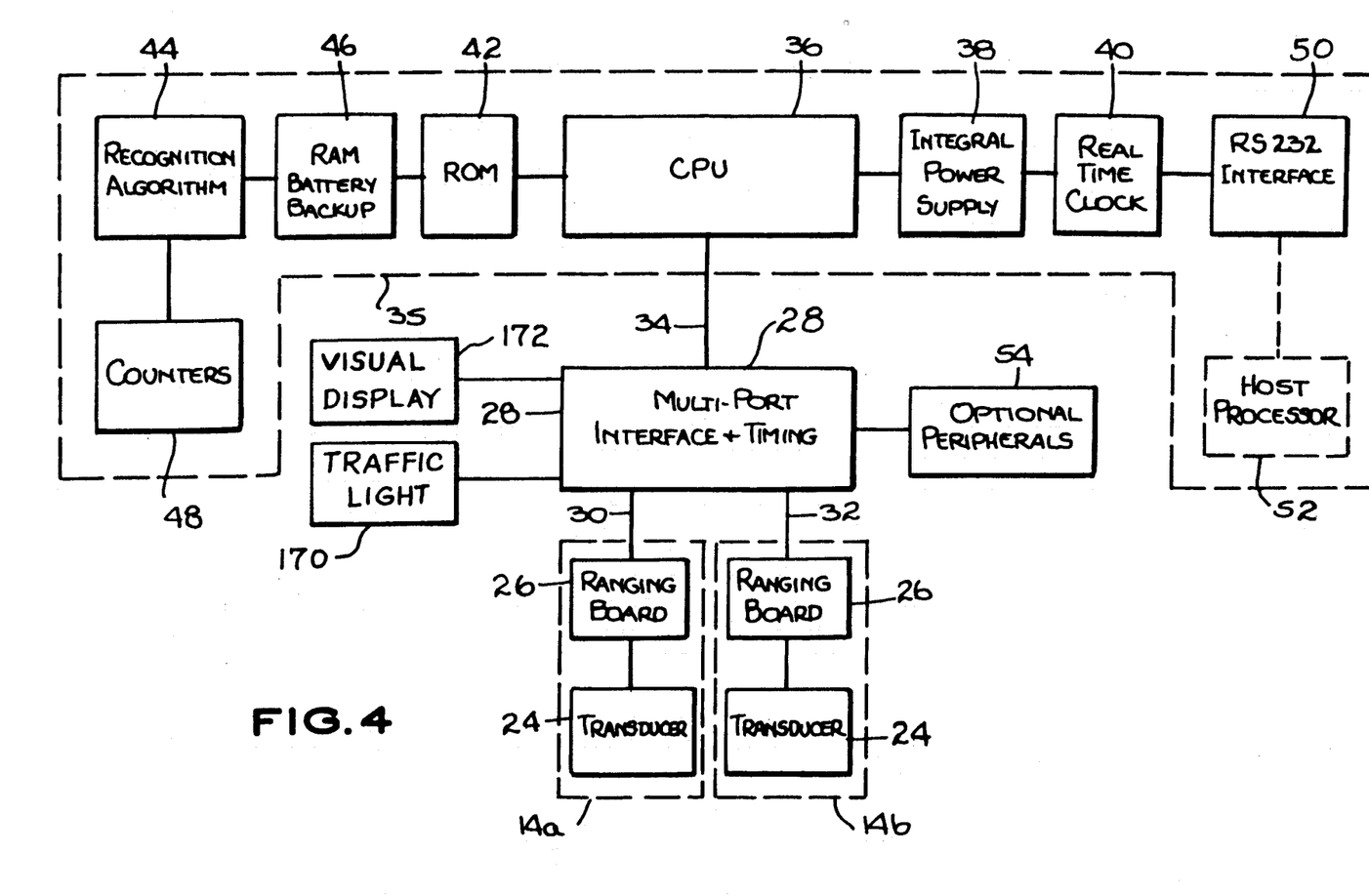
FIG. 4 is a block diagram of a vehicle detector in accordance with the present invention.

In FIG. 4, a block diagram is shown of a vehicle sensor which can be used in conjunction with the present invention for S1, S2. Thus, each of the sensors 14A, 14B includes an ultrasonic transducer 24 which operates in conjunction with a ranging board 26. The sensors 14a and 14b are identical in every respect except that, for reasons which will become apparent, it may be desirable under certain circumstances to adjust the sensors 14a, 14b to operate at different ultrasonic frequencies in order to avoid interference or cross talk between the sensors and assure that sensor 14a only transmits and receives its own signals, while the sensor 14b likewise transmits and receives its own signals. In this manner, accuracy of measurements can be maintained. This is particularly true where multiple sets of sensors are used in adjacent, normally non-channelized, lanes 10, 10' as shown in FIGS. 1 and 2. The specific transducers and ranging boards that are used are not critical, and any such units may be used. One example of such units are those made by the Polaroid Corporation and sold under designation Nos. 607281 (Transducer), 607089 (Ranging Board).

Each of the sensors 14a, 14b is respectively connected to a multi-port programmable interface and timing unit 28 via connections 30, 32 respectively. A multi-port programmable interface unit of the type used is made, for example, by XILINX and is sometimes referred to as a programmable logic device. Such interfaces can be programmed to permit concurrent data transfer between a large number of input ports and a microprocessing unit. The XILINX device has 82 input ports, although only eight such input ports are used in the example being described. The output port of the programmable interface device 28 is connected by means of a serial output line 34 to a processing unit 35 which includes a CPU 36. The CPU 36 can be any suitable microprocessor, such as an 8031 or a Z80. The programmable interface or logic device 28 controls the sensors 14a and 14b, and transmits to a processing means 35, which includes a CPU 36, a serial stream of data which needs to be processed.

Typically, the processing means 35 includes an integral power supply 38, and a real time clock 40. The real time clock permits the system to maintain the date and time of day so that transactions or events can be suitably dated and time stamped. A ROM 42 in which a suitable recognition algorithm 44, to be more fully described below, is stored. A battery-backed RAM 46 is provided for storing transactional data for each condition which is detected and for storing intermediate results. With a RAM of approximately 32k, approximately 5,000 four-byte transactions can be stored. Two non-resettable six digit soft counters 48 may be maintained in RAM. Advantageously, these software counters 48 can be reset but preferably not by the customer or attendant at the parking facility. The software associated with such software counters 48 are well known to those skilled in the art and need not be described herein.

The processing unit 35 is advantageously provided with an RS-232 interface 50 which is well known in the art and can output a stream of ASCII data representative of the transactions in RAM 46. The protocols for the RS-232 interface are well known and may be used to interface two or more processing means 35 in order to interconnect lane CPUs. Up to 256 lane CPUs, for example, may be daisy chained so that a host computer 52, which may be the last processing unit of the chain, can act as a host computer to poll the other processing units and send selected information to a regional computer (other CPU) which acts as host in order to collect data, modify programming of individual processing units and generate reports. Suitable polling software for this purpose is available, and one example of such software is CROSS TALK Communications Software.

The system under discussion is extremely versatile in that it can be used as a lane system which may include, for example, LED or other counters which can be read by an attendant, although no data communication takes place to any remote locations. Such a lane system can be used, for example, in the same manner as a loop sensor is used, namely to count or raise a gate or arm of a ticket spitter. In other arrangements, as above suggested, the system may be used in a "facility mode" which contemplates a plurality of processing units 35, either at a common facility, or to interconnect remote facilities with each other in which case a host computer coordinates data acquisition, processing and reporting.

The software algorithm 44 and related software serves three primary functions: firstly to detect a vehicle while identifying a vehicular lane, direction of travel and time and date, and create a transactional file in RAM 46; secondly to communicate with other like processing units or with a host computer, as above described; and thirdly to provide ongoing diagnostics and tamper detection. Tamper detection, as will be more evident from the discussion that follows of FIGS. 4A and 4B, provides an alert that one or both of the sensors is being blinded, that one or both sensors don't function at all, or that one or both sensors are blocked and do not see the ground or pavement surface. All of these alarms are advantageously time and date stamped, so that the operator of the facility can obtain a log of events and know the lane involved, the employee in attendance, the time and date, etc., so that the irregular conditions can be corrected, and accountability determined.

Also illustrated in FIG. 4 is the use of an optional peripheral 54 connected to the programmable logic device or programmable interface 28. Any appropriate peripheral device can be used and can, with appropriate modification, also be connected to the RS 232 interface. However, since the programmable interface unit 28 has numerous ports, it can be connected to operational peripheral devices without tying up the RS232 interface which can advantageously be used for daisy chaining and communicating with the host computer 52 as aforementioned. Examples of optional peripherals include an access gate, a traffic light 170, an LED/LCD display 172, a ticket spitter, etc. Thus, once the CPU 36 detects a vehicle, using the guidelines or parameters which are programmed into the ROM 42, an appropriate signal can be transmitted to the optional peripheral 54 to enable the same in a known or conventional manner.

An additional example of optional peripheral is the connection of additional ultrasonic sensors, either individually to extend the zone of detection within a lane, or in pairs to extend the zone of detection to adjacent but not channelized lanes as in a wide entranceway.

Figure 5A:
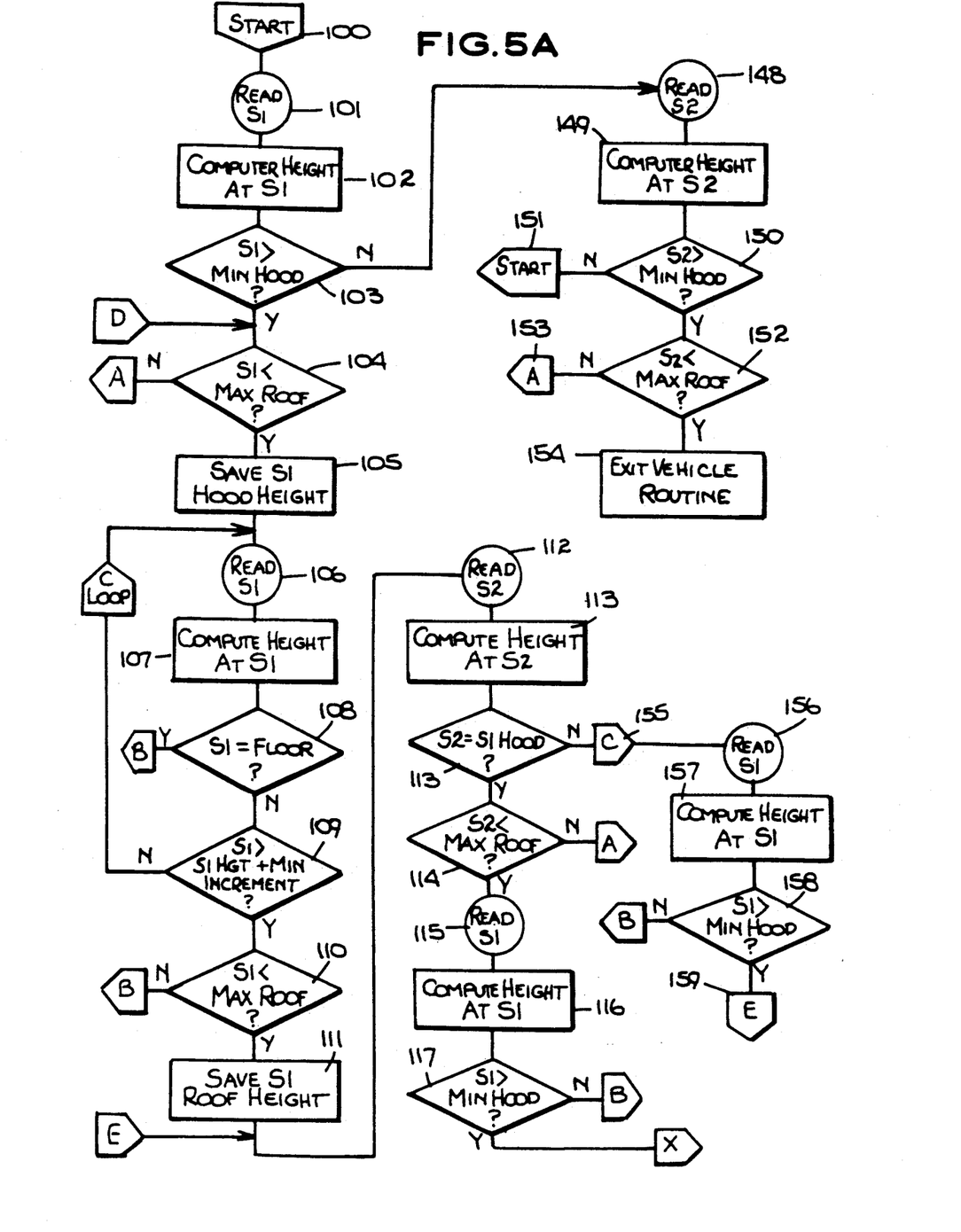
FIGS. 5A and 5B are simplified flow diagrams of the processing operation employed in the practice of the invention.
Figure 5B:
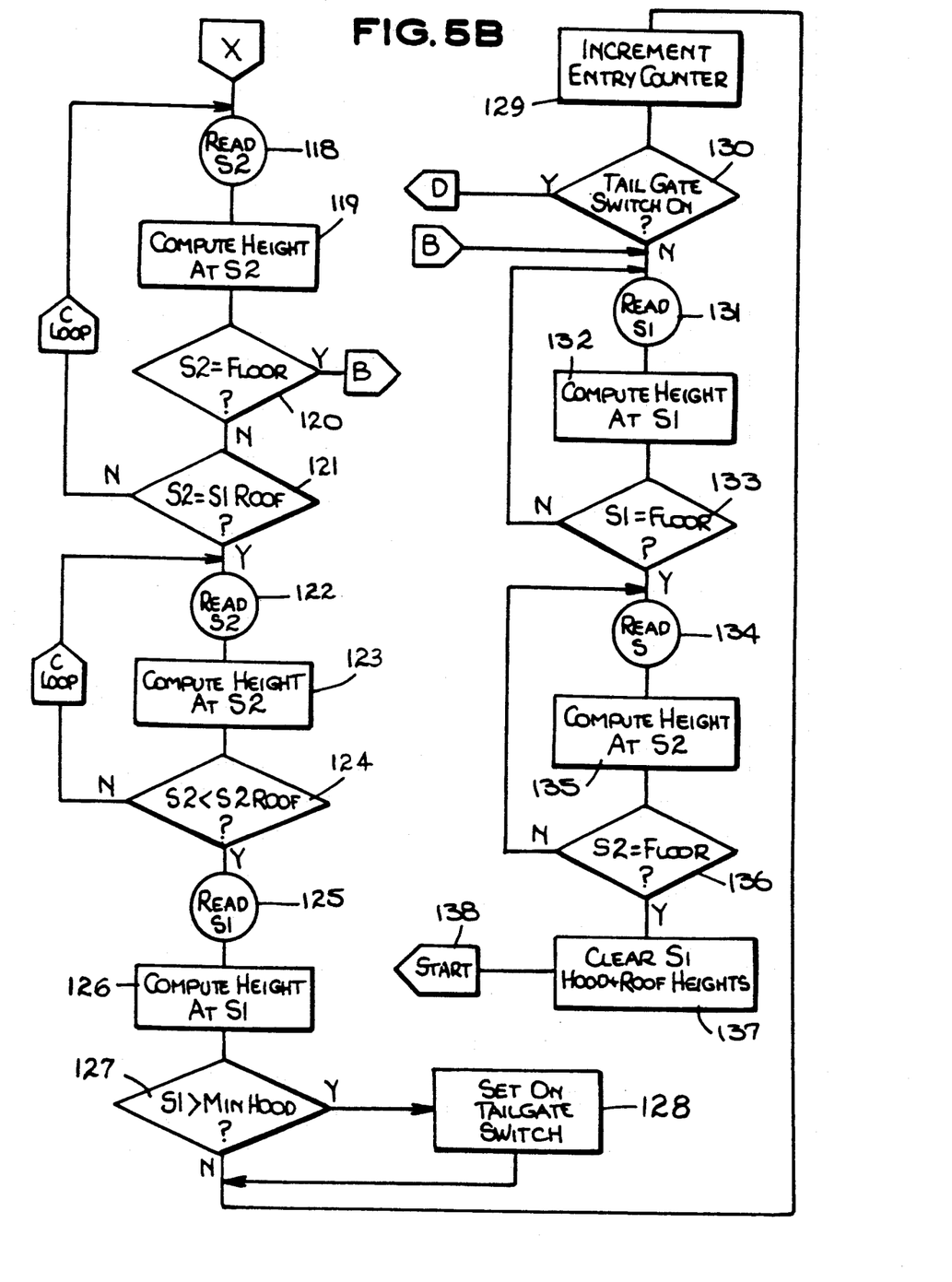

Referring to FIGS. 5A and 5B, there is illustrated a flow chart of the recognition algorithm 44, it again being assumed, as in FIG. 3, that the street-side sensors, i.e., sensors mounted closest to the outside of the parking facility, are designated by the reference S1. Parking facility-side sensors, i.e. sensors mounted closest to the inside of the garage are designated by the reference S2. An entering vehicle will always be detected by sensor S1 before it is sensed by S2, while an exiting vehicle will always be first detected by sensor S2 before sensor S1. Also, the algorithm takes advantage of the fact that the sensors S1, S2 are mounted six feet apart, as above suggested. This means that a countable object (vehicle) must be greater than six feet long, i.e. present under both sensors at the same time during its passage or detection cycle. The six foot separation also provides the basis for detecting tailgating, as will be more fully described in connection with the flow charts. Once sensor S2 has determined that the vehicle height changes from the roof 20 to a lower trunk 22 level, the algorithm assumes that the vehicle has already completely cleared the street-side sensor S1 because the rear end of the car is less than six feet in length. Consequently, if the sensor S1 does not detect the ground, then it starts to detect the next entering vehicle.

Referring to FIGS. 5A and 5B, S1 initially reads (101) the initial end of the vehicle which, presumably, is the hood 18. Based upon the reflections of the ultrasonic signals from the hood 18, the height of the hood is computed (102). The algorithm tests (103) the hood height to determine whether the S1 reading is greater than the minimum hood height. The presence of a vehicle as first detected by the sensing of a height greater than a specified minimum hood height, which, as suggested above, has arbitrarily been selected to be 24" from the ground. If the reading at S1 is greater than the minimum hood height, the algorithm tests (104) the reading against the maximum roof height which has, likewise, been arbitrarily or empirically selected. If a height is selected which is greater than the maximum roof height, the algorithm goes into a time out routine "A" for establishing whether there is sensor tampering, as will be more fully discussed in connection with FIG. 6B. If, however, the S1 reading establishes that the height is less than the maximum roof height, the S1 reading or height is saved (105) in memory (RAM 46). The sensor S1 continues to take readings (106) and computing (107) heights and testing (108) for a height $G_1$ to determine whether it has read or detected the ground level. If it has, the algorithm goes into a "zero out" cycle or reset cycle "B" to be described. However, as long as the S1 sensor continues to detect heights less than $G_1$, the algorithm continues to check (109) the heights measured by S1 as against previously stored S1 hood height measurements to determine whether subsequent measurements by S1 exceed the initially measured hood heights by a predetermined increment to confirm that measurements are no longer being made of the hood 18 but of the roof 20. If the height measured by S1 exceeds the initially measured roof height plus an established hood to roof increment, the algorithm again compares (110) the S1 measured height with the maximum roof height. If the measurement at S1 is less than the maximum roof height, the S1 roof height is saved (111). If the measured roof height is not less than the maximum roof height, the algorithm returns to the "zero out" reset cycle indicated by the designation "B". After the vehicle has proceeded through the initial positions shown in FIGS. 3A and 3B, the measured values at S1 of the hood height and roof height have been stored (111) in RAM memory 46. The car now proceeds to the position shown in FIG. 3C at which time sensor S2 makes an initial reading (112) and the height of the vehicle at S2 is computed (113) based upon the reflections from the hood 18 of the vehicle. The algorithm then compares (113) the roof height at S2 with the previously saved roof height measured at S1. If the two roof heights are not equal, the algorithm proceeds to a time out sub-routine to determine whether there is a blocked lane (sub-routine "C") described more fully in connection with FIG. 6A. If confirmation is obtained that the hood heights measured by the sensors S1 and S2 are the same, a determination is next made (114) as to whether the measured height of the vehicle by the sensor S2 is less than the maximum established roof height and, if so, the sensor S1 again reads (115) the height and a computation is made (116) to determine (117) whether the height measured by sensor S1 is greater than the minimum hood height. If not, the algorithm checks for detection of ground in sub-routine "B". However, if the measured height at S1 continues to be above the minimum hood height, the height is read (118) and computed (119) at sensor S2. The designation "x" merely signifies that the flow chart on FIG. 5A continues on FIG. 5B. If the height at S2 senses (120) the ground again a "zero out" cycle "B" is initiated. However, if ground is not detected at the sensor S2, the algorithm checks (121) to determine whether the height sensed at S2 is equal to the roof height sensored at S1. This procedure confirms that the roof height read by the sensor S2 corresponds to that read by S1 and that, indeed, a vehicle is moving through the vehicular lane. However, if such confirmation is not obtained, the algorithm again checks for blocked lane using sub-routine "C". If confirmation is obtained the height at S2 is read (122) and the height computed (123) to establish (124) whether there has been a roof to trunk height decrease if no change has taken place in the height readings at sensor S2, a blocked lane condition is again checked for utilizing sub-routine "C".

If the detected height at the sensor S2 is less than the previously measured S2 roof height, another reading is taken (125) at sensor S1 and height computed (126) to determine (127) whether the then current reading exceeds the minimum hood height. If this is the case, a tailgate switch is activated (128) after which an entry counter is incremented (129). If the height measured at S1 is not greater than the minimum hood height, this signifies that the vehicle has passed the S1 monitoring point and no tailgating has been sensed. Again, the entry counter is incremented (129).

After the entry counter has been incremented, the algorithm checks (130) to see if the tailgate switch had been turned on. If so, the algorithm proceeds (by way of path "D") as though another vehicle enters, starting at (104), to sense and to determine whether the height of the vehicle measured at the sensor S1 is less than the maximum roof height $H_r$. The cycle is then again commenced to determine whether a next subsequent vehicle is to be counted.

If the tailgate switch had not been turned on, the algorithm goes through a "zero out" cycle at "B". Firstly, the sensor S1 determines (131-133) whether it senses the road surface. If S1 reads the hood surface, the sensor S2 likewise seeks to determine (134-136) whether it sees the road surface. If both sensors see the road surface, then, clearly, this indicates that the vehicle has passed through the sensing zone and the various memory registers are cleared (137), at which time the cycle returns (138) to the beginning of the cycle, sensors S1 and S2 continuing to monitor the lane until it senses a reading other than the road surface.

Figure 6A:
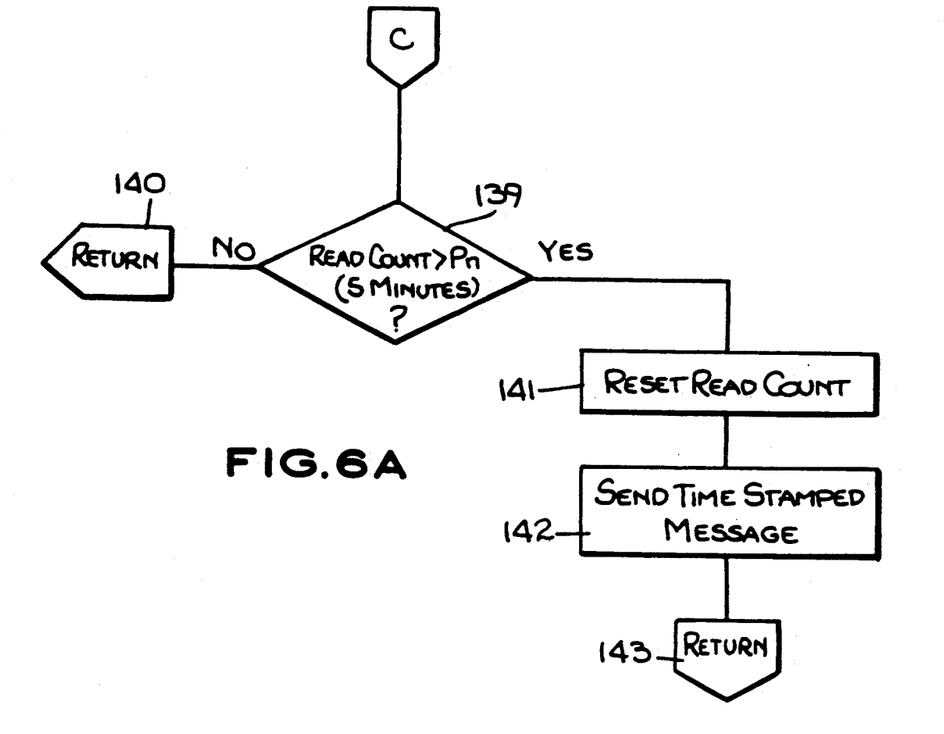
FIGS. 6A and 6B are simplified flow diagrams of two time out loops which may take place during the processing operation shown in FIG. 5.

Referring to FIG. 6A, the time out sub-routine "C" is shown for checking for a blocked lane by counting $P_n$ reflected pulses. The sub-routine "C" involves checking (139) for height readings at either S1 or S2 which remain constant for approximately five minutes at 30 pps, this represents a read count of 9000 pulses. This time period, of course, is arbitrary and any appropriate time period can be selected. If the height determination changes within the time out interval, the sub-routine terminates and the algorithm picks up or continues (140) at the point that it left off. If, however, the read count continues for at least the predetermined time period, the read count register is reset (141) and a time-stamped message is generated (142) to record that a blocked vehicle stopped in the lane either below the sensor S1 and/or the sensor S2. After the message has been generated, the algorithm picks up (143) at the point that it left off and seeks to complete the cycle. Of course, if the vehicle remains blocked in the lane, the blocked lane time out cycle will itself repeat.

Figure 6B:
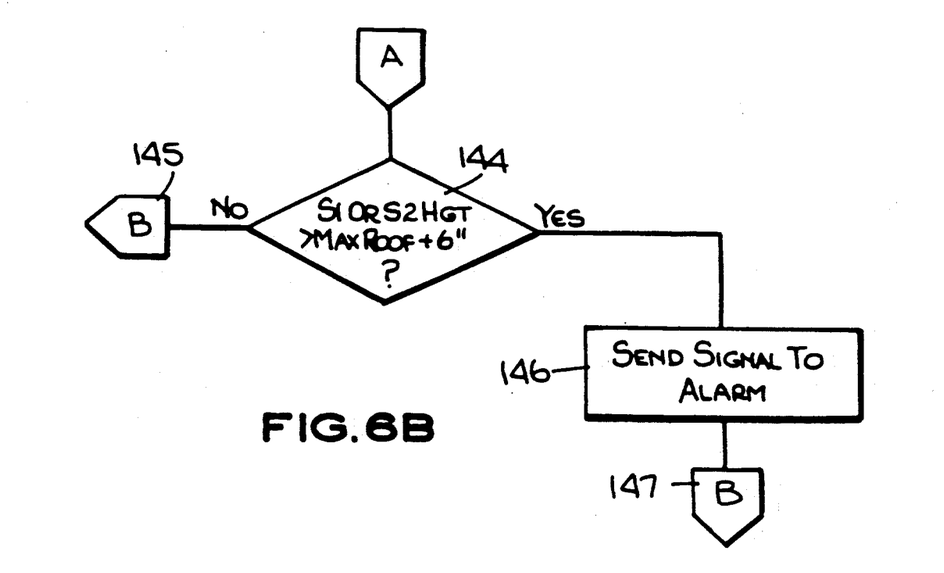

When the sensors S1 and/or S2 read a height of a vehicle which is not less than the maximum roof height, sub-routine "A" commences which is a time out subroutine for detecting tampering (FIG. 6B). Since the system anticipates that heights will not be measured above a maximum allowable roof height, any height measured which is greater than that predetermined roof height will be interpreted as a tampering condition. In the presently preferred embodiment, the sensor tampering sub-routine "A" initially determines (144) whether the height measured at the sensors S1 or S2 exceed the maximum roof height plus six inches, the additional increment serving as a margin of safety to avoid unnecessary false sensor tampering readings. If the measured height at either one of the sensors does not exceed the maximum roof height plus, in this case, six inches, the algorithm returns (145) to the "zero out" cycle "B" so that the entire algorithm may be reinitiated and sensor S1 can again begin the cycle at the "start" point. If, on the other hand, either one of the measured heights exceeds the maximum permissible amount, an appropriate signal is generated (146) to an alarm, and any desired alarm can be initiated to alert that tampering is taking place. Again, after the alarm condition is sent, the "zero out" cycle is initiated (147).

A similar algorithm is utilized in conjunction with an exiting vehicle. Thus, if it is initially determined that the height measured at the sensor S1 is not greater than the minimum hood height, the sensor S2 is checked (148-150) to see whether the height measured at S2 is greater than the minimum hood height. If not, then the algorithm returns (151) to the "start" condition for entering vehicles However, if the height measured at S2 does exceed the minimum hood height when the height measured at the sensor S1 is not greater than the minimum hood height, the algorithm will assume that the vehicle is travelling in the opposite direction and that, therefore, the vehicle is exiting. As with entering vehicles, the height at S2 is then measured to determine (152) whether it is less than the maximum permissible roof height. Again, if the height at S2 exceeds the maximum permissible roof height, the sensor tampering subroutine "A" is initiated (153). If no tampering takes place, and the measured height is less than the maximum roof height, a subroutine (154) similar to the one described for an entering vehicle takes place, where the appropriate software modifications are made to reverse the order or sequence of the sensors, although the identical principals, assumptions and logical computations and determinations are made. For example, instead of saving the S1 hood height (at 111) the S2 hood height would be saved for an exiting vehicle. For the sake of brevity, the same routines will not be described in connection with an exiting vehicle, it being clear to one skilled in the art would know how the described algorithm would have to be modified. Of course, once an exiting vehicle has been detected an exit counter would be incremented in place of the entry counter, before the "zero out" cycle "B" is initiated to reset the entire system.

When the hood heights measured by the two sensors S1, S2 are not equal, the blocked lane time out subroutine "C" is initiated (155) as above suggested, after which the sensor S1 again takes a reading (156) and the height at S1 is computed (157). The computed height at S1 is then tested (158) against the minimum hood height. If the measured height is greater than the minimum hood height, the system attempts to continue the sequence (159), designated as "E", by resuming the measurement (112) at sensor S2. However, if the height at S1 does not exceed the minimum hood height, the algorithm assumes that no vehicle is present and seeks to confirm this by entering (160) the "zero out" reset cycle starting at (131).

In the embodiment described, if a vehicle travels at a constant speed of 10 miles per hour (176" per second) and the sensors transmit sonic pulses at a rate of 30 per second from each sensor, the system will read approximately every six inches of the vehicle length by each sensor during the time it is travelling through the zone of detection. Reading and processing are performed "concurrently" by the multi-tasking software employed and the programmable logic device or programmable interface 28.

The "read" points shown in the algorithm of FIG. 5 represent "readings used by the processing logic. The actual readings may be continuous, but not all of the available reading points are actually processed.

It is advantageous or desirable that at every power-on the system computes and stores the sensor to floor reference distance by taking the average of thirty consecutive hit readings, and adding two inches, to define the reference height for the lane or road surface. Any subsequent height readings greater than the reference height forces an automatic recalibration.

The present invention may be used to establish the presence of a vehicle entering both a parking facility and passing through a toll plaza, and providing additional information which assists in the classification of the vehicle. The embodiment which has been described above has been one which is designed to confirm the presence of a passenger vehicle having a conventional configuration or profile including a roof having a height incrementally stepped from the height of the hood. However, as will become evident to those skilled in the art, the same or similar principles of the present invention described above can be expanded in a number of different respects to provide additional information which makes it possible to better classify smaller vehicles as well as to distinguish between substantively different vehicles, such as passenger cars, limousines, vans and trucks.

Figure 7:
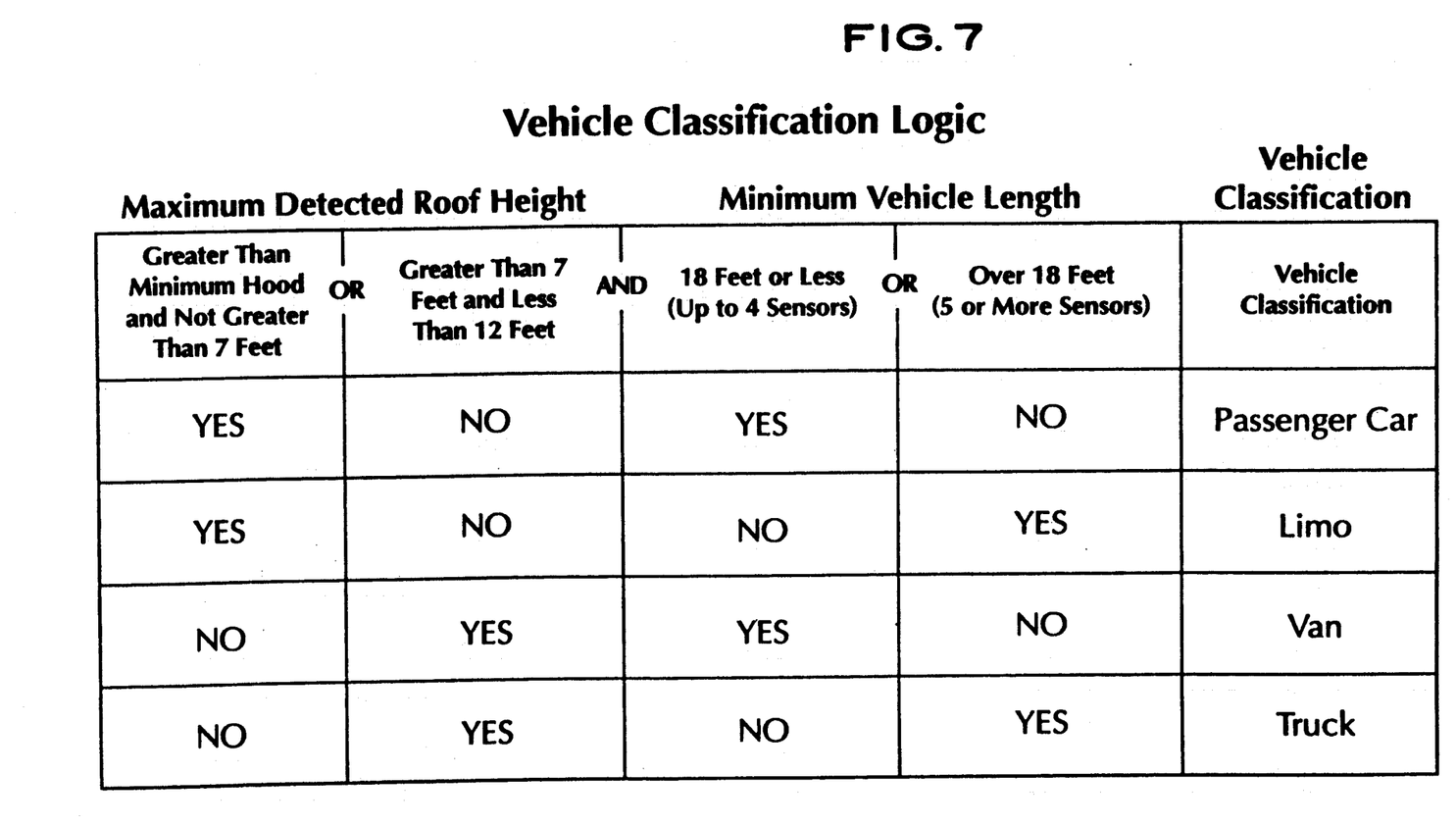
FIG. 7 is a vehicular classification logic table which illustrates, by way of example, the various classifications that can be established by the present invention as a function of maximum detected roof height, roof to hood/trunk relations and the maximum number of sensors that concurrently detect a vehicle.

Parking facilities generally charge for parking on the basis of the size of the vehicle, or by its "footprint", since this parameter determines how much area the vehicle will occupy in the parking facility. On the other hand, tolls charged at toll plazas are not only a function of the footprint of the vehicle but also the nature of the vehicle which is more a function of its cargo carrying capacity. Since most vehicles have substantially the same width, it will be appreciated that the parameters which define the footprint or effective length of the vehicle and the height of the vehicle establish the volumetric capacity of the vehicle, this being a parameter which can assist in determining the classification of the vehicle for the purpose of charging tolls or parking. Referring to FIG. 7, a table is shown which suggests how the present invention can be utilized to distinguish between four different and basic types of vehicles which can be very helpful both for parking facilities and toll plazas. The table in FIG. 7 represents vehicle classification logic which can be used to classify the vehicles into one of the indicated categories. The first column determines whether the maximum detected roof height exceeds a minimum established hood height but is less than seven feet. As will be noted, the first two rows of the first column are marked "yes", for passenger cars and limousines, this requirement not applying to vans and trucks both of which typically have a roof height greater than seven feet. In the second column, there are indicated those maximum roof heights which exceed seven feet but do not exceed twelve feet in height. The third and fourth rows of the second column contain a "YES" which confirms that this requirement is met for vans and trucks, while this requirement is not satisfied for passenger cars and limousines. While the first two columns are concerned with maximum detected heights, the third and fourth columns provide information regarding the overall length of the vehicle. For this purpose, maximum lengths have arbitrarily been selected, which are believed to be accurate for most intended purposes. Thus, for purposes of the logic of FIG. 7, vehicles have arbitrarily been broken down into two categories including those vehicles which have a maximum length of 18 feet, and those which have a length which exceeds 18 feet. In column 3 of the table, the first and third columns confirm that passenger vehicles and vans are less than 18 feet long, while limousines and trucks do not satisfy this requirement but, instead, limousines and trucks have lengths which exceed 18 feet, as indicated in column 4, rows 2 and 4 of the table.

Using an appropriate number of sensors (e.g. sensors S3-S5 in FIG. 3) accurate data can be obtained with regard to the lengths of the vehicles and, as above suggested, also additional information regarding the profiles of the vehicles. In order to measure vehicles of 18 feet or less, up to four sensors can be used, while measuring vehicles over 18 feet in length will generally require five or more sensors. Using the relatively simple logic suggested in FIG. 7, the "footprint" and/or volumetric capacity of a vehicle can be determined as falling into one of the four mentioned categories. As will noted, each row satisfies two established conditions, one for maximum roof height and one for minimum vehicle length, are referenced by the indications "yes". As will be evident to one skilled in the art, establishing which vehicle classification is involved when specified height and length conditions have been satisfied is a relatively straightforward matter. The classifications shown in FIG. 7 are made independent of vehicle speed.

It will be appreciated that the vehicle detection devices of the present invention, with or without the additional classification logic of FIG. 7, can be used for a single lane, a number of adjacent channelized or non-channelized lanes or as part of an overall lane processing system. Additionally, the present invention can be the basis of a new installation, or can be added to existing installations which include, for example, loop detectors, treadles, coin boxes, access gates, ticket spitters, etc. When used with a lane processing system, the present invention enhances the classification. As such, it improves accurate vehicle counts and insures a proper audit trail. The equipment entails no moving parts and is extremely reliable and contributes to the establishment of a sound vehicle detection system.

The detectors of the current system can also be utilized in conjunction with but independently of an existing parking facility or toll plaza vehicle detecting and/or counting system. As suggested above, induction loops are not adequate to detect tailgating. Similarly, access gates are likewise frequently ineffective to deter tailgating. Additionally, an access gate, when out of operation or when tampered with can remain in the open position and cease to provide the functions for which it has been installed. To eliminate this problem and to provide the functions aforementioned as well as to enhance the effectiveness of an existing system, reference is made to FIG. 3, which shows an access gate 56 and an access gate sensor 58 (S6) which is positioned directly above the access gate 56. Advantageously, the "gate up" sensor 58 is calibrated to the top of the access gate 56, and the software for the sensor 58 can, thus, determine when the access gate 56 is in the closed or lowered position shown. In order to increase the amount of reflected energy from the generally narrow access gate 56, there may be provided a horizontal plate or surface 60 which increases the surface area from which the ultrasonic pulses emanating from the sensor S6 are reflected. Using an algorithm similar to the one shown in FIG. 6A, the sensor S6 can conduct a time-out routine when it does not sense the access gate 56 in its normal or lowered position shown. Clearly, the time out period can be selected to any desired amount, such as five minutes. If the detector S6 does not see the lowering of the gate within that period an alarm or other indication may be provided to indicate that there is a malfunction with the gate 56 or an abuse or tampering therewith. As will be appreciated to those skilled in the art, such a back up or auxillary function of the sensor S6 can be used to audit the effects of the access gate and to minimize or totally eliminate tailgating.

While a particular embodiment of the present invention has been illustrated and described herein, it is not intended to limit the invention to such disclosure, and changes and modifications may be made therein and thereto within the scope of the appended claims.

We claim:

1. Vehicle sensor system for detecting vehicles having predetermined length and height profiles and at least a predetermined minimum length along a direction of movement through a vehicular traffic lane, which comprises
   (a) first and second ultrasonic transmitting units spaced from each other along the traffic lane a distance less than said predetermined minimum length, said first transmitting unit being arranged upstream of the direction of traffic and said second transmitting unit being arranged downstream of the direction of traffic, each of said transmitting units being mounted to transmit ultrasonic signals downwardly in the direction of a vehicle moving through the lane;
   (b) first and second ultrasonic receiving units associated with said first and second transmitting units, respectively, and arranged above the traffic lane for receiving the ultrasonic signals emitted by the associated ultrasonic transmitting unit and reflected from the road surface or the ground and from successive portions of the vehicle travelling through the traffic lane;
   (c) height determining means for determining the heights of surfaces from which said reflected ultrasonic signals have been reflected and received by each of said ultrasonic receiving units; and
   (d) processor means for verifying absolute and relative measured heights and discounting spurious data, and issuing a vehicle detect signal when a determination has been made that the detected heights in both said ultrasonic receiving units conform with each other and conform with said predetermined vehicle length and height profiles of the vehicles.

2. Vehicle sensor system as defined in claim 1, further comprising memory means for storing preselected profile height parameters and accessing means for accessing stored height parameters by said processing means.

3. Vehicle sensor system as defined in claim 1, wherein said transmitter units are spaced approximately six feet apart along the traffic lane.

4. Vehicle sensor system as defined in claim 1, wherein said ultrasonic transmitting and receiving units comprise ranging units.

5. Vehicle sensor system as defined in claim 4, wherein said processor means comprises a CPU and further comprising a programmable logic device interfacing said CPU and said ultrasonic transmitting and receiving units.

6. Vehicle sensor system as defined in claim 1, wherein said processor means comprises a CPU and an RS232 interface, and further comprising a host computer for polling the data in said processor means.

7. Vehicle sensor system as defined in claim 1, wherein said processor means comprises a CPU and an RS232 interface for connection to like vehicle sensor systems to form a daisy chain of vehicle sensors.

8. Vehicle sensor system as defined in claim 1, further comprising at least one peripheral responsive to said vehicle detect signal.

9. Vehicle sensor system as defined in claim 8, wherein said peripheral comprises a visual display.

10. Vehicle sensor system as defined in claim 8, wherein said peripheral comprises a traffic light.

11. Vehicle sensor system as defined in claim 8, wherein said peripheral comprises an access gate.

12. A vehicle sensor system as defined in claim 1, further comprising an access gate movable between a normal lowered position which prevents access to a restricted area and a raised position which permits access to the restricted area, and gate sensor means above said access gate for transmitting ultrasonic signals in the direction of said access gate and detecting reflections from said access gate, whereby said gate sensor means detects the position of said access gate.

13. A vehicle sensor system as defined in claim 12, further comprising reflector means mounted on said access gate for enhancing the reflections of the ultrasonic signals from said access gate.

14. A vehicle sensor system as defined in claim 13, wherein said reflector means comprises a plate mounted on said access gate which is substantially horizontal in the lowered position of said access gate.

15. A method of detecting vehicles having predetermined length and height profiles and at least a predetermined minimum length along a direction of movement through a vehicular traffic lane, comprising the steps of
   (a) transmitting ultrasonic signals downwardly from two positions spaced from each other a predetermined distance above the traffic lane less than said predetermined minimum length;
   (b) receiving ultrasonic signals at each of said positions reflected from the road surface or the ground and from successive portions of a vehicle travelling through the traffic lane;
   (c) determining the heights of reflecting surfaces at said two positions based on said received ultrasonic signals;
   (d) verifying said heights and discounting spurious data; and
   (e) issuing a vehicle detect signal when a determination has been made that the detected heights of both said positions conform to each other and with said predetermined vehicle length and height profiles.

16. A method as defined in claim 15, wherein the step of verifying includes insuring that said heights are within a range of predetermined values.

17. A method as defined in claim 16, wherein the vehicles have a hood and roof and the heights for verification are that the hood height be above a predetermined minimum and that the roof height be below a predetermined maximum.

18. A method as defined in claim 17, further comprising the step of saving the heights for subsequent comparing.

19. A method as defined in claim 17, further comprising the step of issuing an alarm when said heights exceed maximum roof heights by a predetermined value.

20. A method as defined in claim 19, wherein an alarm is issued when said heights exceed maximum roof height by approximately 6 inches.

21. A method as defined in claim 17, wherein the minimum hood height is 24 inches.

22. A method as defined in claim 17, wherein the maximum roof height is 84 inches.

23. A method as defined in claim 15, wherein the ultrasonic signals are in the form of pulses which are transmitted at a rate of approximately 30 pulses per second.

24. A method as defined in claim 15, further comprising the step of accessing data by polling.

25. A method as defined in claim 15, further comprising the step of actuating a peripheral device when said vehicle detect signal is issued.

26. A method as defined in claim 15, further comprising the step of incrementing an entry counter when a vehicle enters a garage and incrementing an exit counter when the vehicle exits the garage.

27. A method as defined in claim 15, further comprising the step of zeroing out a detecting cycle when the heights detected at both the positions are zero or ground.

28. A method as defined in claim 15, further comprising the step of monitoring said heights at at least one of said positions for time periods which exceed a predetermined amount and generating an indication that the traffic lane is blocked.

29. A method as defined in claim 28, wherein the predetermined time period is approximately five minutes.

* * * * *